Patented June 4, 1946

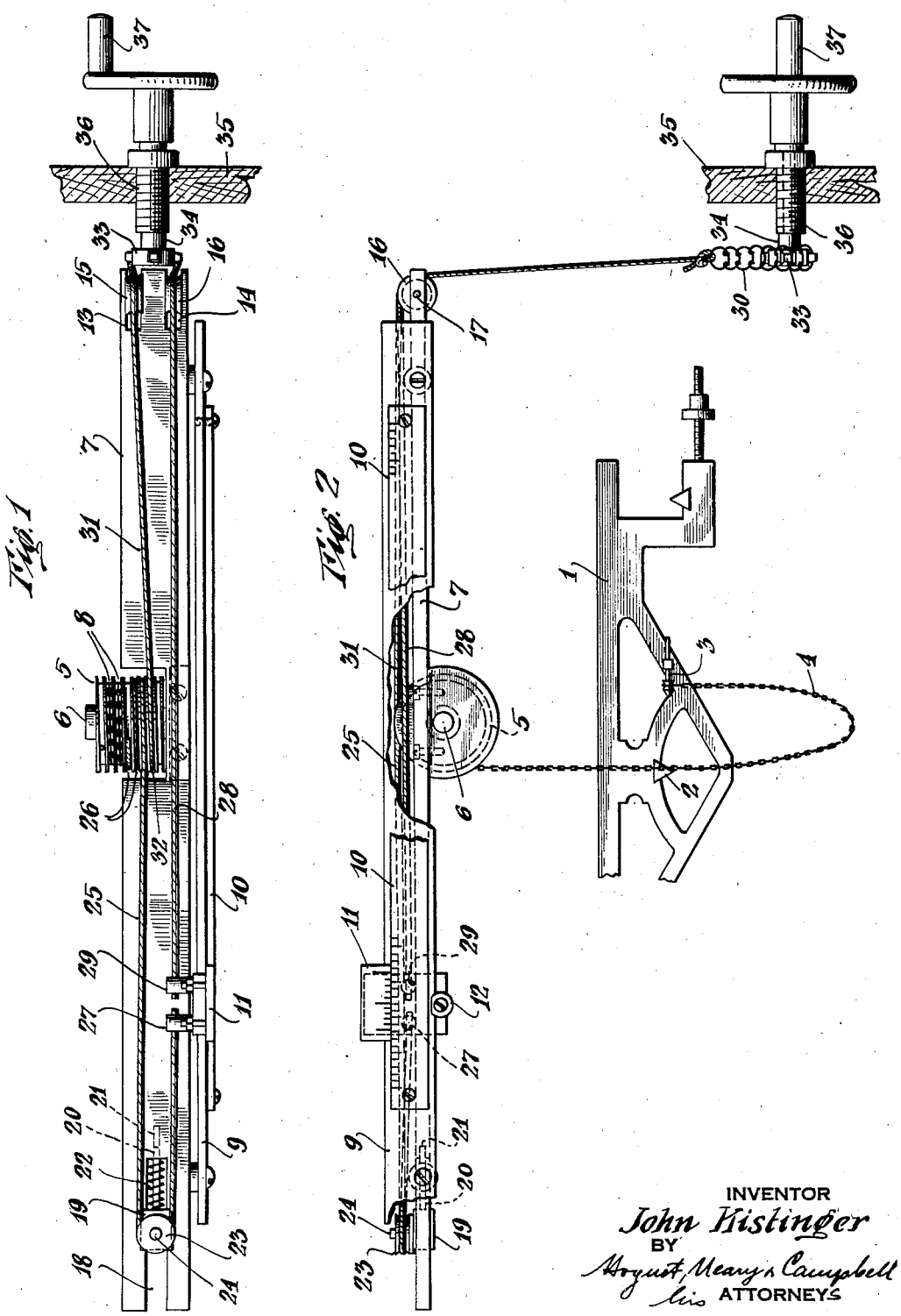

2,401,487

UNITED STATES PATENT OFFICE 2,401,487

BALANCE

John Kistinger, New Rochelle, N. Y., assignor to Voland & Sons, Inc., New Rochelle, N. Y., a corporation of New York Application July 13, 1943, Serial No. 494,548

2 Claims. (Cl. 265—60)

The present invention relates to analytical balances and, more particularly, to an improved weight adjusting and indicating means for balances of the type utilizing a suspended chain as a balance weight.

Heretofore, balances provided with chain members as balance weights have been difficult to manipulate and have been characterized by an inconvenient arrangement of the adjusting and indicating means. Accordingly, it is an object of my invention to provide an improved adjusting means, for use in connection with a chain balance weight, which is characterized by an extreme accuracy and which may be conveniently disposed for quick and easy operation.

A further object of my invention is to provide an improved indicating means comprising a scale and vernier attachment, for use in conjunction with my improved weight adjusting means, which may be disposed horizontally for ease and accuracy in reading.

Another object of my invention is to provide convenient and accurate means for interconnecting my improved weight adjusting and indicating means to simplify and facilitate the handling of the scales.

Further and additional objects of my invention will be apparent as the description proceeds, reference being had to the accompanying drawing, in which Figure 1 is a top plan view of a weight adjusting and interconnected indicating means, and Figure 2 is a front view of the above means showing the manner of disposing the same in service.

Referring to the drawing, a balance beam 1, shown partly broken away, is provided with a knife blade 2 adapted to be supported on a post (not shown in the drawing). Disposed to one side of the knife blade, is an adjustable supporting screw 3 from which a chain balancing weight 4 is suspended. The chain 4 is supported at its other end by a reel 5 rotatably mounted on a post 6 fixed on a frame member 7. A portion of the chain is wound upon the reel as indicated at 8, and is preferably fixed adjacent its end to the reel to prevent slippage. As will be seen from Figure 1, the reel and scale beam are so mounted that the suspended portion of the chain is maintained in a vertical plane that is substantially parallel to the scale beam and also to the reel.

Fixed to the frame member 7 is a member 9 which serves as a support for an elongated scale 10 calibrated to read in terms of weight. The scale 10 is provided with a vernier scale 11 slidably carried thereon and maintained on the scale by a set screw 12.

The frame member 7 is formed with two slots 13 and 14 adjacent one end in which are received pulleys 15 and 16 rotatably fixed thereto by, for example, a pin 17. The opposite end of the frame member 7 is provided with a slot 18 which has a tongue and groove connection for slidably supporting a block 19. The block 19 is affixed to a plunger 20 which is slidably received within an opening 21 in the frame member. Spring means 22 is provided between the block 19 and the opening 21 and disposed about the plunger 20 normally urging the block 19 outwardly from the frame member 7. A pulley 23 is rotatably mounted on the block by a pin 24.

A cord 25 fixed at one end to the reel to avoid slippage is partly wound on the reel as indicated at 26 and extends laterally about the movable pulley 23 to a post 27 on the vernier scale 11. A second cord 28 fixed at one end to a second post 29 on the vernier scale 11 extends about the pulley 16 and is fixed at its other end to one end of a drive chain 30. The drive chain is also connected at its opposite end to a third cord 31 which extends over the pulley 15 and is partly wound on the reel 5 as indicated at 32 and fixed at its end thereto. The cord 31 is wound on the reel in an opposite direction to that of the cord 25 and the balance chain 4.

The drive chain 30 engages a sprocket 33 carried on a shaft 34 conveniently disposed and supported by the balance casing 35 by means of a sleeve 36. Fixed to the shaft is a crank 37 whereby the apparatus may be conveniently manipulated.

It will be apparent from the above description that upon operation of the crank 37, the drive chain 30 and cords 25, 28 and 31 will cooperate to actuate the reel 5 and vernier scale 11, simultaneously. When the reel 5 is actuated in a counter-clockwise direction, looking at the front view, the balance chain 4 is unwound so that more weight is made to depend from the supporting screw 3. At the same time the vernier scale 11 correspondingly and slidably is moved to the right for indicating the increase in the weight supported by the beam 1. Upon a reverse actuation of the reel 5, the opposite movement of the chain weight and the vernier scale takes place. The spring means 22 associated with pulley 23 and normally urging the pulley outwardly of the frame 7, insures the avoidance of lost motion.

It will be appreciated that the calibration of the indicating means may be simply and conveniently accomplished by one skilled in the art.

It will be apparent that many variations may be made in the above embodiment of my invention without departing from the spirit thereof, and all such variations are intended to be included within the scope of the following claims.

I claim:

1. In a balance, a frame member, two pulleys mounted adjacent one end of said member, a third pulley yieldingly mounted at the opposite end of the frame member, a scale mounted on the frame, a vernier indicating means carried on the scale, a reel mounted on the frame, a cord fixed at one end to said vernier extending about said third pulley and partly wound on said reel, a second cord partly wound on said reel and having one end extending over one of said other pulleys, a drive chain connected at one end to the end of said second cord, a sprocket in engagement with said chain, means for rotating said sprocket, a third cord fixed at one end to the opposite end of said drive chain extending over the second of said other pulleys and fixed to the vernier, a scale beam, and a chain balance member fixed at one end to said scale beam and having a portion thereof carried on the reel.

2. In a balance comprising a beam, a frame member supported above the beam, a horizontal scale supported on said frame, a vernier indicating means carried on said scale, a reel carried by said frame, a weighing chain wound on said reel and having its free end connected to said beam, a pulley connected to said reel to rotate the same, a pulley at one end of said frame, a pair of pulleys at the other end of said frame, flexible means passing over said second mentioned pulley and connected to said vernier and passing over said first mentioned pulley and movable therewith, flexible means connected to said vernier and passing over said pair of pulleys serially and over said first mentioned pulley and movable therewith, and a rotatable operating means cooperating with the stretch of the flexible means extending between the pulleys of said pair of pulleys.

JOHN KISTINGER.